United States Patent [19]
Numata

[11] Patent Number: 5,415,258
[45] Date of Patent: May 16, 1995

[54] ONE-WAY CLUTCH HAVING AN OUTER RING WHOSE INTERNAL PORTION IS AS HARD AS ITS PERIPHERY

[75] Inventor: Tetsuaki Numata, Kitakatsuragi, Japan

[73] Assignee: Koyo Seiko Co., Ltd., Osaka, Japan

[21] Appl. No.: 124,226

[22] Filed: Sep. 21, 1993

[30] Foreign Application Priority Data

Oct. 15, 1992 [JP] Japan ................... 4-277047

[51] Int. Cl.⁶ .................. F16D 41/06; F16C 33/62
[52] U.S. Cl. .................. 192/41 A; 192/45.1; 192/107 T; 384/492; 384/625; 384/912
[58] Field of Search ............ 192/45.1, 41 R, 45, 192/107 T, 41 A; 384/492, 625, 912, 913

[56] References Cited

U.S. PATENT DOCUMENTS

| | | | |
|---|---|---|---|
| 3,207,278 | 9/1965 | Titt | 192/45.1 |
| 4,347,921 | 9/1982 | Bordes | 192/45.1 X |
| 5,016,741 | 5/1991 | Leitz | 192/45.1 |
| 5,084,116 | 1/1992 | Mitamura | 148/319 |
| 5,139,123 | 8/1992 | Rutke | 192/45.1 |
| 5,183,139 | 2/1993 | Malecha | 192/45 |
| 5,211,274 | 5/1993 | Milano, Jr. et al. | 192/45 |
| 5,219,053 | 6/1993 | Castens | 192/45 |

Primary Examiner—Andrea L. Pitts
Attorney, Agent, or Firm—Wenderoth, Lind & Ponack

[57] ABSTRACT

In a one-way clutch, an outer ring has an internal portion whose hardness is substantially the same as that of its periphery, both hardnesses preferably being HRC 55 or more. When sprags interposed between the outer ring and inner ring are engaged with an inner peripheral surface of the outer ring and press the inner peripheral surface radially outwardly, the internal portion having the hardness of HRC 55 or more backs up the inner peripheral surface to prevent the inner peripheral surface from being deformed radially outwardly. Therefore, "roll-over" can be prevented and the maximum transmission torque is increased.

3 Claims, 2 Drawing Sheets

ONE-WAY CLUTCH HAVING AN OUTER RING WHOSE INTERNAL PORTION IS AS HARD AS ITS PERIPHERY

BACKGROUND OF THE INVENTION

1. Field of the Invention

The present invention relates to a one-way clutch for use in an automobile, a motor-bicycle, or the like.

2. Description of the Prior Art

Conventionally, in the above kind of one-way clutch, cam members are held in place by a cage between an inner ring and an outer ring and urged in one direction by a spring, and end bearings are disposed on both sides of the cage between the inner ring and the outer ring. It is common to make such inner and outer rings of carbon steel. Conventionally, the inner and outer rings of carbon steel have been normally subjected to an induction hardening process or a carburizing process so that their peripheries (surface portions) are made harder than their internal portions.

When an excessive torque is transmitted from the inner ring to the outer ring, the outer ring is subject to strain, and called "roll-over" (a phenomenon in which the cam members decline too much over their engaging position and the inner ring idles) occurs, which has been a factor for limiting the maximum transmission torque of the one-way clutch.

A conventional solution to the roll-over is to increase the radial thickness of the outer ring and reduce the strain or deformation of the outer ring.

However, the scheme of increasing the radial thickness of the outer ring to prevent the roll-over increases the size and weight of the outer ring.

SUMMARY OF THE INVENTION

The object of the present invention is therefore to provide a one-way clutch capable of preventing the roll-over and increasing the maximum transmission torque without increasing the size and the weight of the outer ring.

In order to achieve the aforementioned object, the inventor of the present invention has carried out various experiments and examinations. As a result, the inventor has discovered that, in the outer ring, the periphery (surface portions) having a higher hardness is deformed toward the internal portion having a lower hardness rather than the whole outer ring being deformed when the roll-over occurs, and regarded it as a cause of the roll-over. Therefore, the inventor considered that the roll-over might be prevented by hardening the internal portion of the outer ring to substantially the same extent as the hardness of the periphery without increasing the radial thickness of the outer ring, and this assumption has been confirmed through experiments.

Thus, the present invention provides a one-way clutch comprising:

an inner ring;

an outer ring whose internal portion has a hardness substantially same the as that of a periphery of the outer ring, the hardnesses of the internal portion and the periphery being not lower than a specified hardness;

a plurality of cam members disposed between the inner ring and the outer ring for transmitting a torque from the inner ring to the outer ring;

a cage disposed between the inner ring and the outer ring for holding the plurality of cam members in position;

a spring member for forcing the plurality of cam members in one specific direction; and a pair of end bearings disposed on both sides of the cage and between the inner ring and the outer ring.

The periphery includes an inner peripheral surface, an outer peripheral surface and end faces.

When the cam members are transmitting a torque from the inner ring to the outer ring while being engaged with the outer ring and the inner ring, the outer ring receives from the cam members a force acting to cause the inner peripheral surface of the outer ring to be deformed radially outward. However, because the inner peripheral surface of the outer ring has substantially the same hardness as that of the internal portion thereof, the outer ring is prevented from being deformed at the inner peripheral surface toward the inside, i.e., radially outwardly. This is because the internal portion acts as a backup (or support) of the inner peripheral surface. Therefore, a torque resulting in the roll-over (referred to as simply roll-over torque) and therefore the maximum transmission torque is increased. Furthermore, since the outer ring has a hardness not lower than a specified value at all portions thereof, the total strength of the outer ring increases and the entire body of the outer ring is hardly deformed. This also increases the roll-over torque.

In an embodiment of the present invention, the above-mentioned specified hardness for the outer ring is preferably HRC (Rockwell hardness) 55. In this case, the roll-over can be prevented very effectively to result in increasing of the maximum transmission torque.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 1:
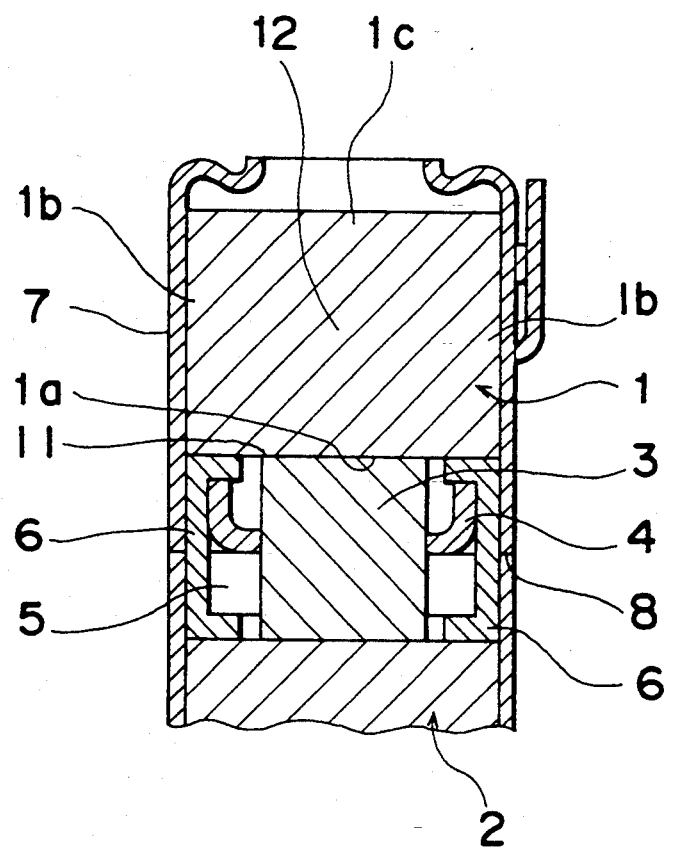
FIG. 1 is a sectional view of an essential part of a one-way clutch in accordance with an embodiment of the present invention FIG. 2 a graph showing a relation between an outer ring radial thickness ratio (a radial thickness of an outer ring/a raceway diameter) and a roll-over torque ratio (a roll-over torque/a rated torque) with the internal hardness serving as a parameter.

Referring to FIG. 1, a one-way clutch is shown which has an outer ring 1 having a configuration adapted to engage with an external element (not shown) an inner ring 2, sprags 3 exemplified as cam members interposed between the outer ring 1 and the inner ring 2, a cage 4 for retaining the sprags 3 such that the sprags can sway, a spring 5 for urging the sprags 3 in one specific direction, a pair of end bearings 6 which are arranged on both sides of the cage 4 and interposed between the outer ring 1 and the inner ring 2, and a pair of retainer plates 7 and 8 engaged with a protruding outer peripheral portion of the outer ring 1 to hold the end bearings 6 and 6 in position.

The outer ring 1 is composed of high carbon chromium bearing steel (SUJ 2 (Japanese Industrial Standard)) and has been subjected to quenching and tempering processes. Thus the periphery (which comprises peripheral surface portions including an inner peripheral surface 1a, end faces 1b and an outer peripheral surface 1c) generally indicated by 11 and an internal portion 12 surrounded by the periphery 11 have a hardness not lower than HRC 55.

With the above-mentioned arrangement, when the outer ring 1 and the inner ring 2 rotate relative to each other in a torque transmission direction, the sprags 3 are engaged with the inner peripheral surface 1a of the outer ring 1 and an outer peripheral surface of the inner ring 2 to transmit a torque from the inner ring 2 to the outer ring 1. At this time, the outer ring 1 receives from the sprags 3 a force acting so as to radially outwardly deform or strain the inner peripheral surface 1a. However, the inner peripheral surface 1a is prevented from being deformed toward the internal portion 12, i.e., radially outwardly because the inner peripheral surface 1a and the internal portion 12 of the outer ring 1 have substantially the same high hardness and the internal portion 12 backs up (i.e. support) the inner peripheral surface 1a. Consequently, the maximum transmission torque is increased.

Furthermore, since the outer ring 1 has a hardness of as high as HRC 55 or more at both its periphery 11 and internal portion 12, the strength of the outer ring 1 is increased as a whole and the entire body of the outer ring 1 is hardly deformed. The increased strength of the outer ring also contributes to the increase in the maximum transmission torque.

Figure 2:
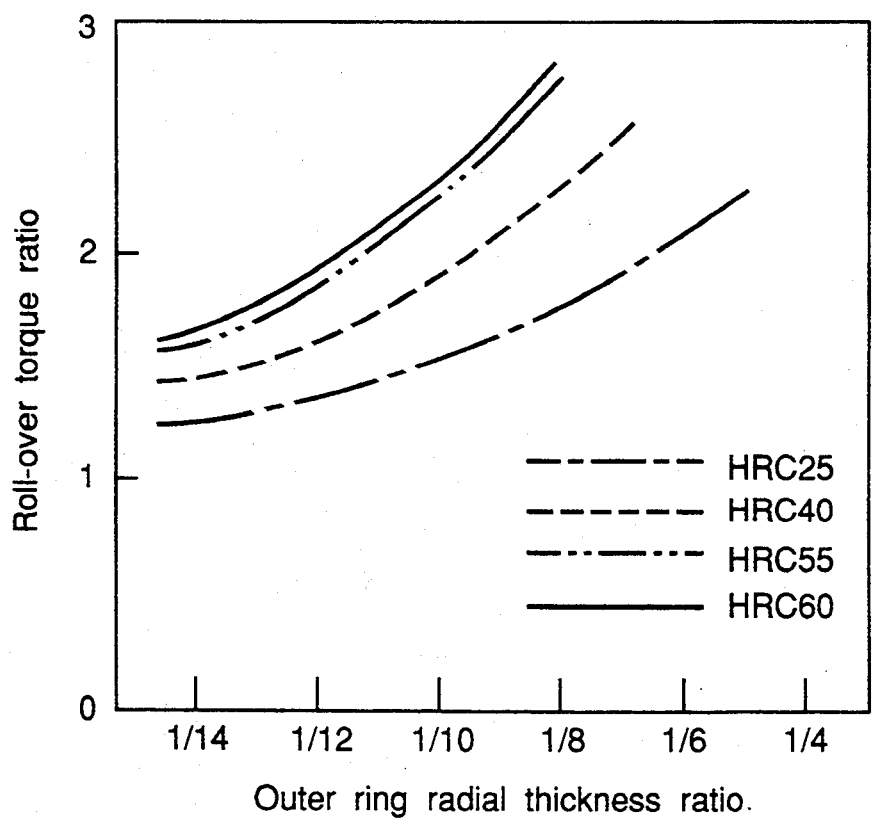

FIG. 2 is a graph showing characteristics of the one-way clutch as constructed as above where the axis of abscissas represents an outer ring radial thickness ratio (radial thickness/raceway diameter), the axis of ordinates represents a roll-over torque ratio (roll-over torque/rated torque), and the internal hardness serves as a parameter. As is evident from FIG. 2, when the outer ring has an internal hardness of HRC 60, a very high roll-over torque ratio was obtained. It is noted that the outer ring having an internal hardness of HRC 55 or more produced a significant effect.

Figure 3:
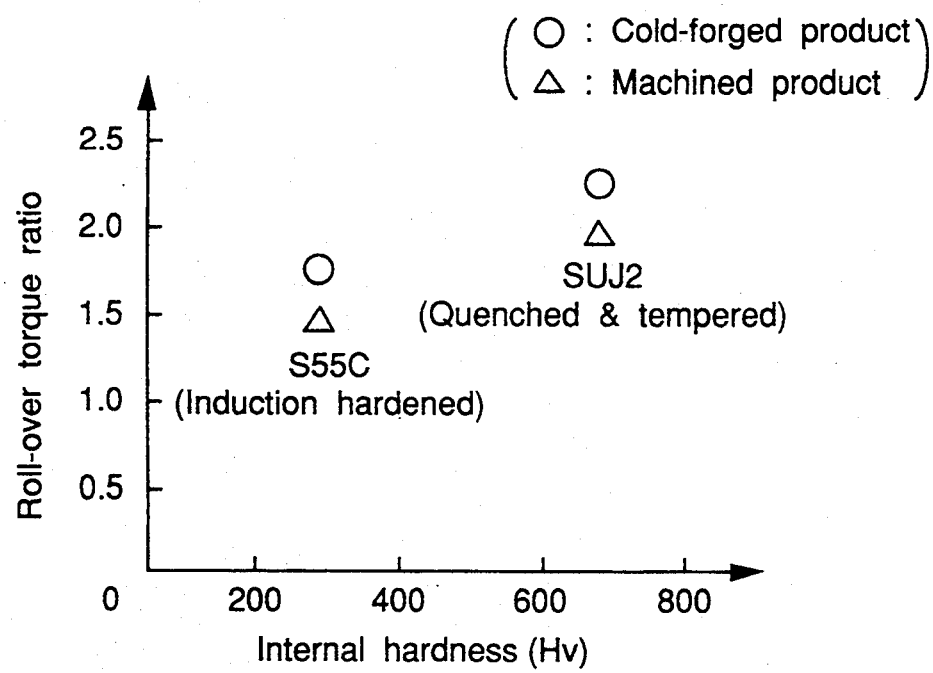
FIG. 3 is a graph showing a relation between the internal hardness and the roll-over torque ratio.

FIG. 3 shows a graph where the axis of abscissas represents the internal hardness (Vickers hardness Hv) of the outer ring, and the axis of ordinates represents the roll-over torque ratio. As is evident from FIG. 3, an outer ring has a very high roll-over torque ratio which is obtained by cold-forging a material SUJ 2 (Japanese Industrial standard) and then quenching and tempering the cold-forged product. It is noted that in an outer ring obtained by quenching and tempering the material SUJ 2, the internal portion and the periphery (surface portions) have substantially the same hardness.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch comprising:
    an inner ring;
    an outer ring having an internal portion and peripheral surface portions surrounding the internal portion, the internal portion having a hardness substantially the same as a hardness of the peripheral surface portions, the hardnessess of the internal portion and the peripheral surface portions being not lower than a specified hardness;
    a plurality of sprags disposed between the inner ring and the outer ring for transmitting a torque from the inner ring to the outer ring;
    a cage disposed between the inner ring and the outer ring for holding the plurality of sprags in position;
    a spring member for forcing the plurality of sprags in one specific direction; and
    a pair of end bearings disposed on both sides of the cage and between the inner ring and the outer ring;
    said hardened internal portion constituting a means for preventing roll-over of said sprags relative to said outer rings.

2. The one-way clutch as claimed in claim 1, wherein said specified hardness is HRC 55.

3. The one-way clutch as claimed in claim 2, wherein the outer ring is formed of a high carbon chromium bearing steel and has been subjected to quenching and tempering processes.

* * * * *